United States Patent
Chang et al.

(10) Patent No.: US 10,816,083 B2
(45) Date of Patent: Oct. 27, 2020

(54) LUBRICATION SYSTEM OF POWER ASSEMBLY OF ELECTRIC SCOOTER

(71) Applicant: FUKUTA ELECTRIC & MACHINERY CO., LTD., Taichung (TW)

(72) Inventors: Chin Feng Chang, Taichung (TW); Hung Chun Ke, Changhua County (TW)

(73) Assignee: Fukuta Electric & Machinery Co., Ltd., Taichung (TW)

( * ) Notice: Subject to any disclaimer, the term of this patent is extended or adjusted under 35 U.S.C. 154(b) by 250 days.

(21) Appl. No.: 16/059,734

(22) Filed: Aug. 9, 2018

(65) Prior Publication Data

US 2020/0049248 A1 Feb. 13, 2020

(51) Int. Cl.
*F16H 57/04* (2010.01)
*B62M 6/75* (2010.01)
*B62M 6/65* (2010.01)
*F16H 57/02* (2012.01)
*F16H 57/08* (2006.01)
*B62M 6/80* (2010.01)

(52) U.S. Cl.
CPC ........... *F16H 57/0424* (2013.01); *B62M 6/65* (2013.01); *B62M 6/75* (2013.01); *B62M 6/80* (2013.01); *F16H 57/043* (2013.01); *F16H 57/08* (2013.01); *B62K 2202/00* (2013.01); *F16H 2057/02065* (2013.01)

(58) Field of Classification Search
CPC ....... F16H 2057/02065; F16H 57/0424; F16H 57/043; F16H 57/08; B62K 2202/00; B62M 6/75
USPC ........................................................ 184/6.12
See application file for complete search history.

(56) References Cited

U.S. PATENT DOCUMENTS

| | | | | |
|---|---|---|---|---|
| 4,872,530 | A * | 10/1989 | Burgess | F16H 57/0482 184/6.12 |
| 4,957,187 | A * | 9/1990 | Burgess | B01D 19/0052 184/6.12 |
| 6,044,931 | A * | 4/2000 | Reed, Jr. | F16H 3/006 184/6.12 |
| 8,356,586 | B2 * | 1/2013 | Roderique | F02B 33/40 123/559.1 |
| 8,905,885 | B2 * | 12/2014 | Yamamoto | B60K 6/405 180/65.235 |
| 2016/0369853 | A1 * | 12/2016 | Sugiura | F01M 1/10 |
| 2019/0337382 | A1 * | 11/2019 | Yu | F16H 57/028 |
| 2020/0047847 | A1 * | 2/2020 | Chang | B62M 6/45 |
| 2020/0047848 | A1 * | 2/2020 | Chang | B62M 7/12 |

* cited by examiner

*Primary Examiner* — Michael R Mansen
*Assistant Examiner* — Mark K Buse
(74) *Attorney, Agent, or Firm* — Wang Law Firm, Inc.

(57) ABSTRACT

A lubrication system of a power assembly of an electric scooter includes a case duct and a bearing seat duct formed in a case of the power assembly, and a driven gear shaft duct formed in a driven gear shaft of a driven gear. Lubricant flows to the case duct, the driven gear shaft duct, a driven gear bearing seat in the case, the bearing seat duct, a driving bearing seat in the case in sequence. The lubrication system has a short flowing distance of the lubricant to enhance the effects of lubrication and reducing temperature.

10 Claims, 14 Drawing Sheets

LUBRICATION SYSTEM OF POWER ASSEMBLY OF ELECTRIC SCOOTER

BACKGROUND OF THE INVENTION

1. Technical Field

The present invention relates to an electric scooter, and more particularly to a lubrication system of a power assembly of an electric scooter.

2. Description of Related Art

A conventional electric scooter is driven by an electric motor, and a gearbox is provided to transmit the power of the motor to the wheels. Since the electric motor and the gears of the gearbox are flowing in a high speed, they need lubricant lubrication and lowering temperature.

In the conventional electric scooter, the electric motor and the gearbox are two independent devices, so that two independent pipes from a pump to the electric motor and the gearbox respectively are provided for lubrication. Typically, the effect of lubrication decreases when a flowing distance of the lubricant increases. Furthermore, it usually generates bubbles when the lubricant is flowing in the pipe, and the bubble is bad for the effect of lubricant.

BRIEF SUMMARY OF THE INVENTION

In view of the above, the primary objective of the present invention is to provide a lubrication system of a power assembly of an electric scooter, which has a short lubricant flowing distance to increase the lubrication effect.

A secondary objective of the present invention is to provide a lubrication system of a power assembly of an electric scooter, which may eliminate bubbles in the lubricant quickly.

A third objective of the present invention is to provide a lubrication system of a power assembly of an electric scooter, which provides the lubricant to the meshed teeth of the driving and the driven gears.

In order to achieve the objective of the present invention, a lubrication system of a power assembly of an electric scooter includes a case duct and a bearing seat duct formed in a case of the power assembly, and a driven gear shaft duct formed in a driven gear shaft of a driven gear.

Lubricant flows to the case duct, the driven gear shaft duct, a driven gear bearing seat in the case, the bearing seat duct, a driving bearing seat in the case in sequence. The lubrication system of the present invention has a short flowing distance of the lubricant to enhance the effects of lubrication and reducing temperature.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
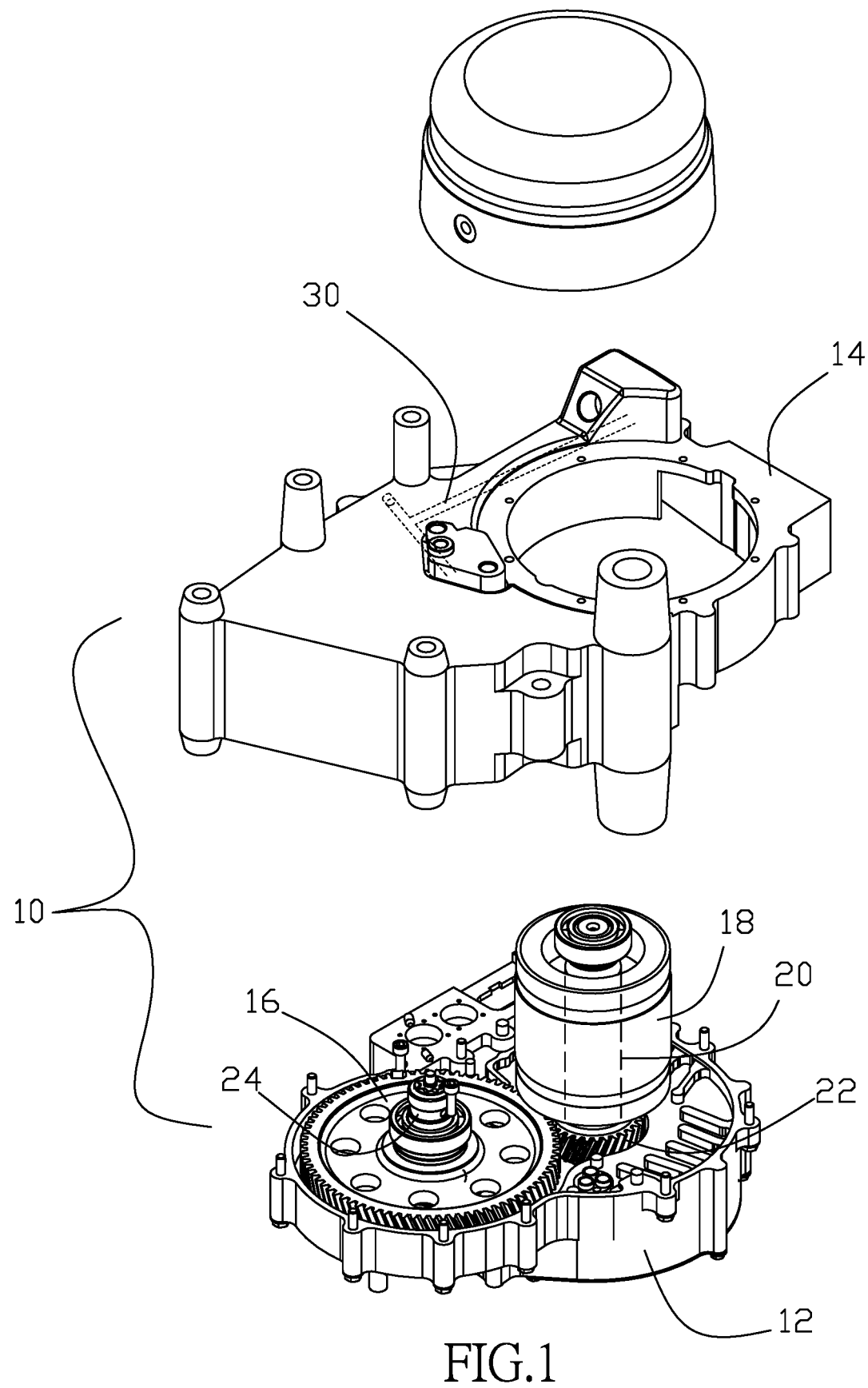
FIG. 1 is an exploded view of a preferred embodiment of the present invention.
Figure 2:
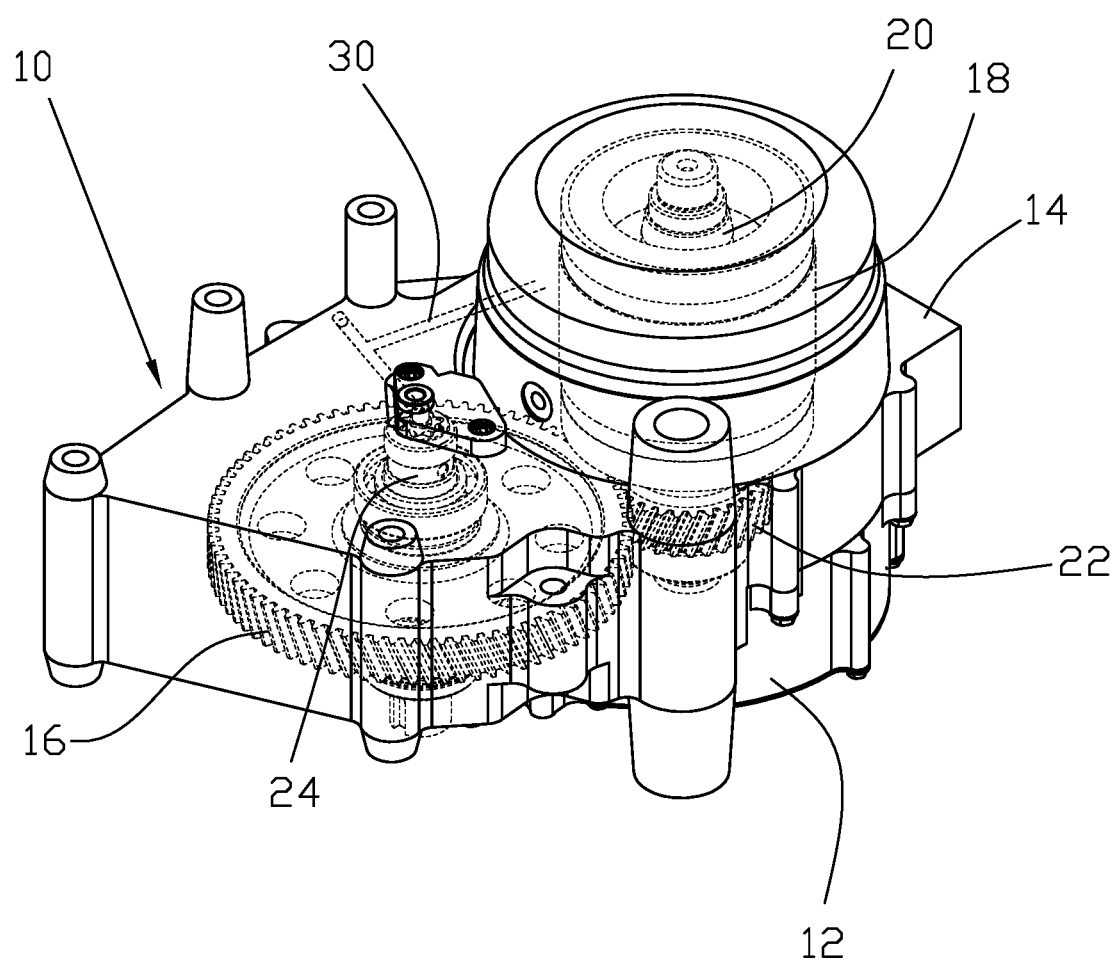
FIG. 2 is a perspective view of the preferred embodiment of the present invention.

As shown in FIG. 1 and FIG. 2, a power assembly of an electric scooter of the preferred embodiment of the present invention includes a case 10, in which a driven gear 16 and an electric motor 18 are received. The case 10 has a base 12 and a connecting base 14 connected to the base 12. The electric motor 18 has a driving shaft 20 and a driving gear 22 connected to the driving shaft 20. The driving gear 22 is received in the base 12 for free rotation. The driven gear 16 has a driven gear shaft 24, which is received in the base 12 and meshed with the driving gear 22.

The case 10 is provided with a lubrication duct unit for lubricant to flow. The lubrication duct unit includes a case duct 30 formed on an interior side of the case 10. Particularly, the case duct 30 is made by a drilling machine to form a tunnel or a plurality of communicated tunnels in the connecting base 14. In the present preferred embodiment, the case duct unit 30 includes two tunnels forming a T-shaped duct, and an end of the case duct unit 30 extends to the driven gear 12.

Figure 3:
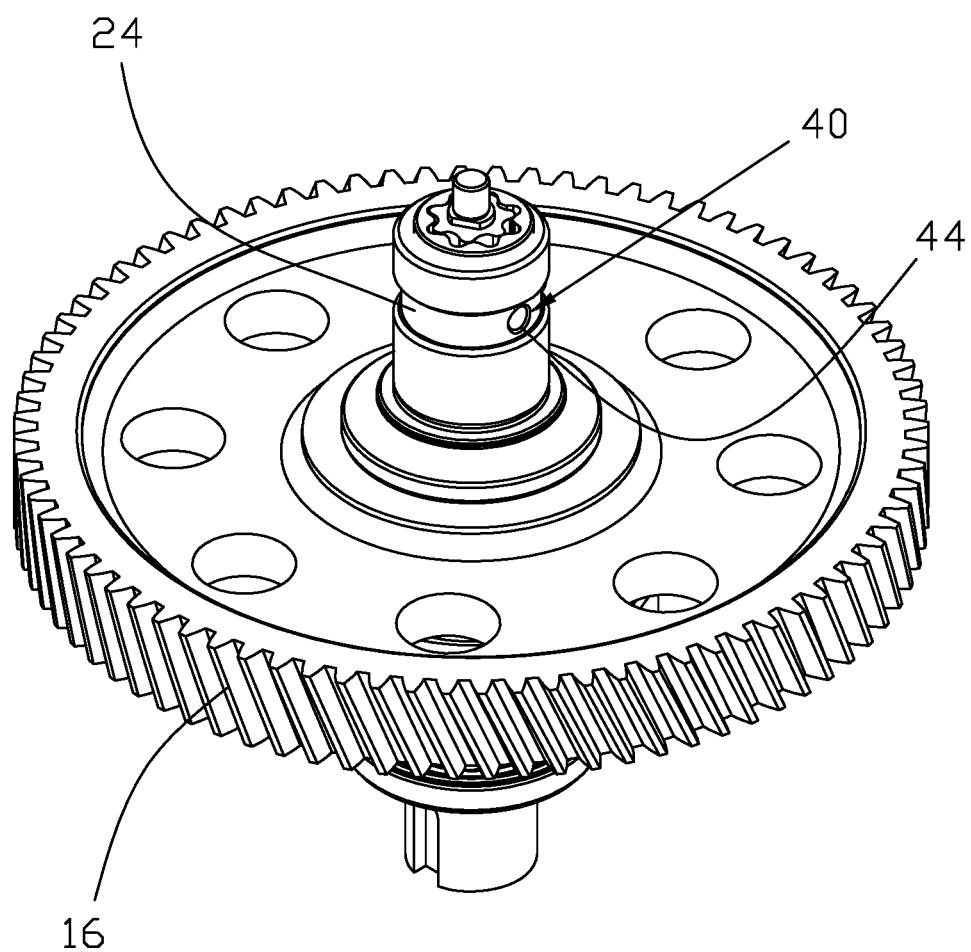
FIG. 3 is a perspective view of the driven gear of the preferred embodiment of the present invention.
Figure 4:
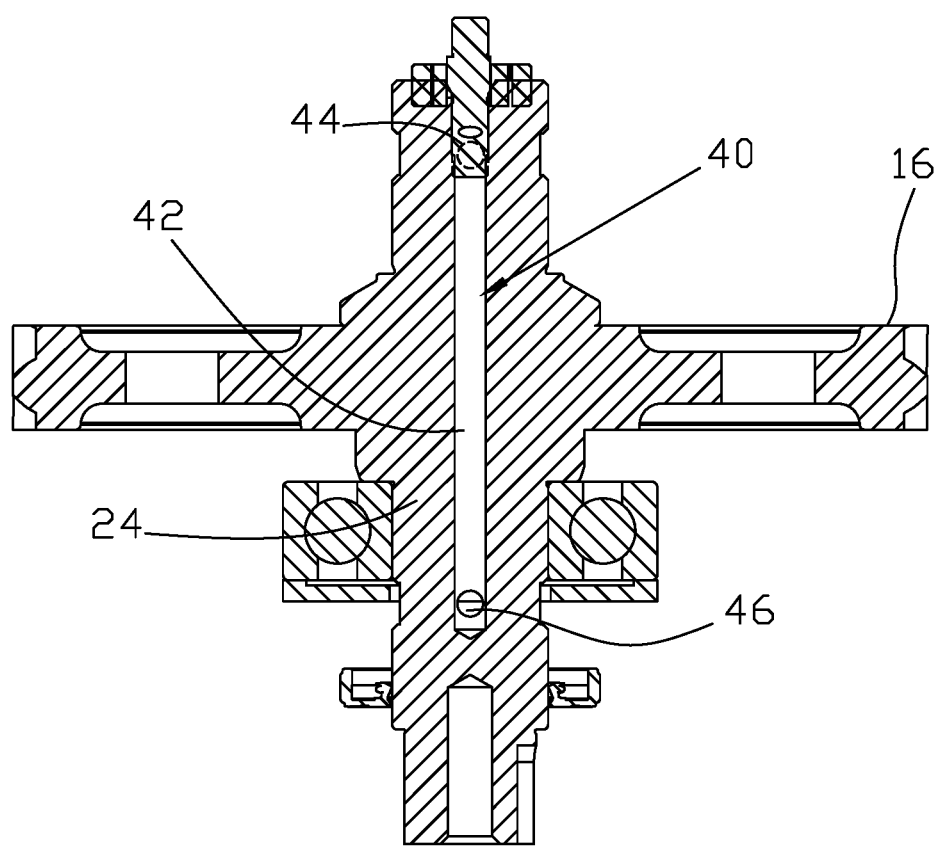
FIG. 4 is a sectional view of the driven gear of the preferred embodiment of the present invention.

As shown in FIG. 3 and FIG. 4, the lubrication duct unit further includes a driven gear shaft duct 40 in the driven gear shaft 24. The driven gear shaft duct 40 includes an axial section 42, a first bore 44 and a second bore 46. The axial section 42 extends in an axial direction of the driven gear shaft 24, and both the first and the second bores 44, 46 extend in a radial direction and are communicated with the axial section 42. In the present embodiment, the first bore 44 is above the driven gear 16, and the second bore 46 is below the driven gear 16.

Figure 5:
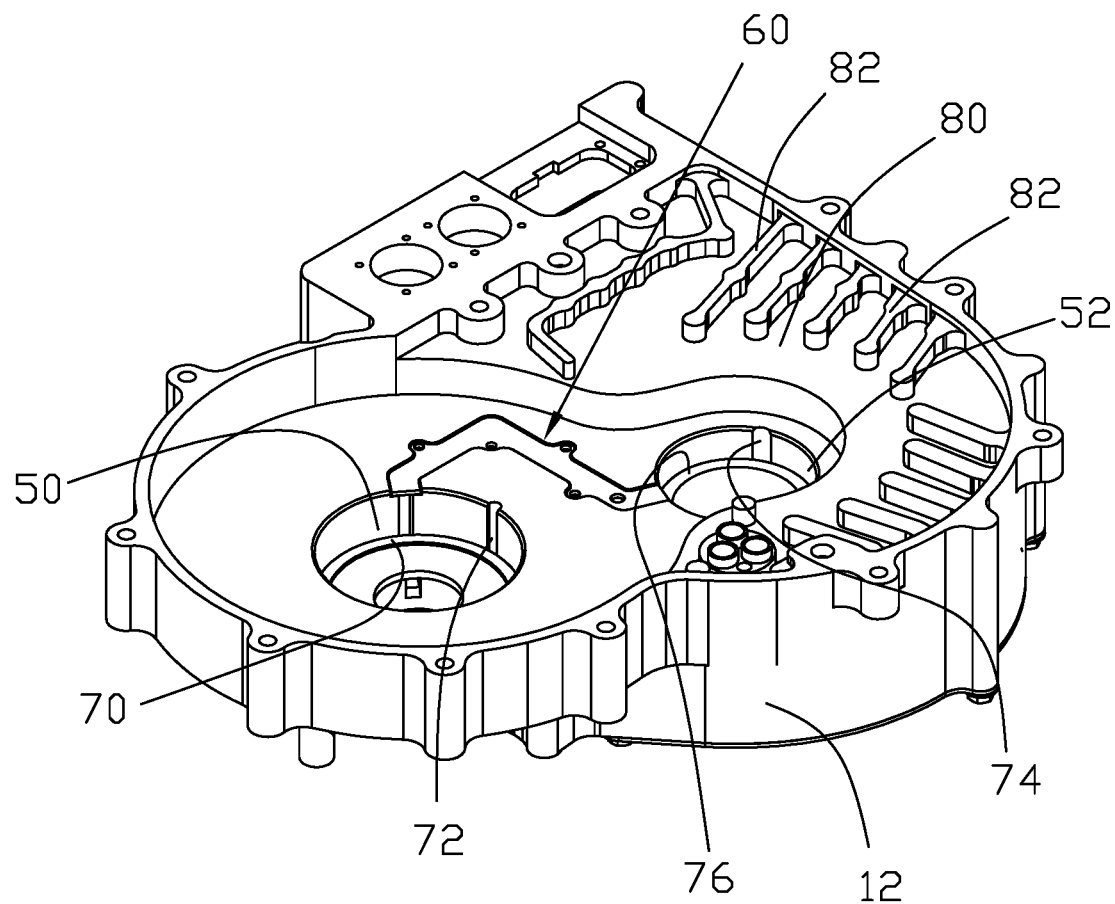
FIG. 5 is a perspective view of the base of the preferred embodiment of the present invention, showing the bearing seat duct.

As shown in FIG. 5, the base 12 is provided with a driven gear bearing seat 50 and a driving gear bearing seat 52. In the present embodiment, both the bearing seats 50, 52 are two slots formed on the base and have a bottom respectively.

The lubrication duct unit further includes a bearing seat duct 60 formed on a bottom of the base 12, which has opposite ends communicated with the driven gear bearing seat 50 and the driving gear bearing seat 52.

Figure 6:
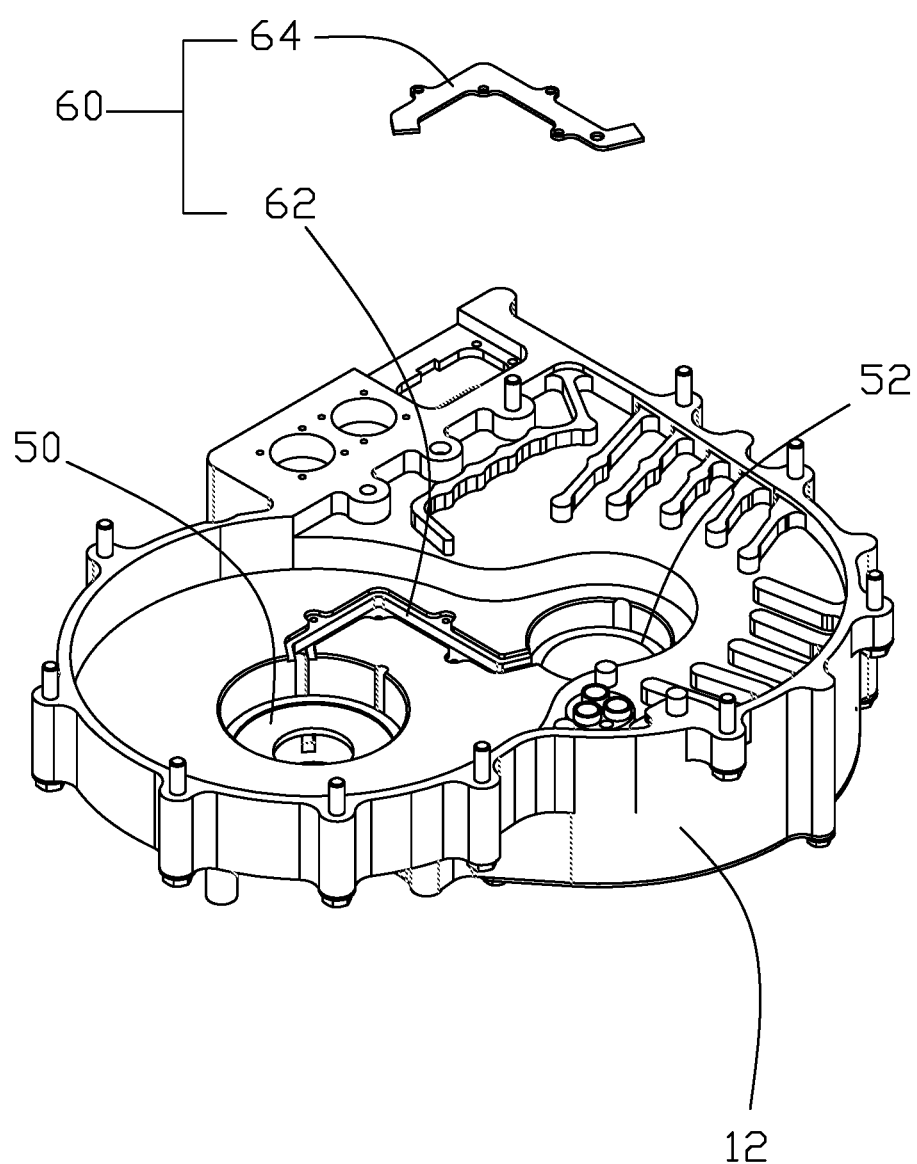
FIG. 6 is an exploded view of the base of the preferred embodiment of the present invention, showing the bearing seat duct.

As shown in FIG. 6, the bearing seat duct 60 includes a slot section 62 and a lid 64. The slot section 62 is formed on the bottom of the base 12 and is opened at the bottom. The lid 64 is fixed to the bottom of the base 12 to seal the slot section 62, therefore, the bearing seat duct 60 is formed in the base 12 and has opposite ends communicated with the driven gear bearing seat 50 and the driving gear bearing seat 52.

Figure 7:
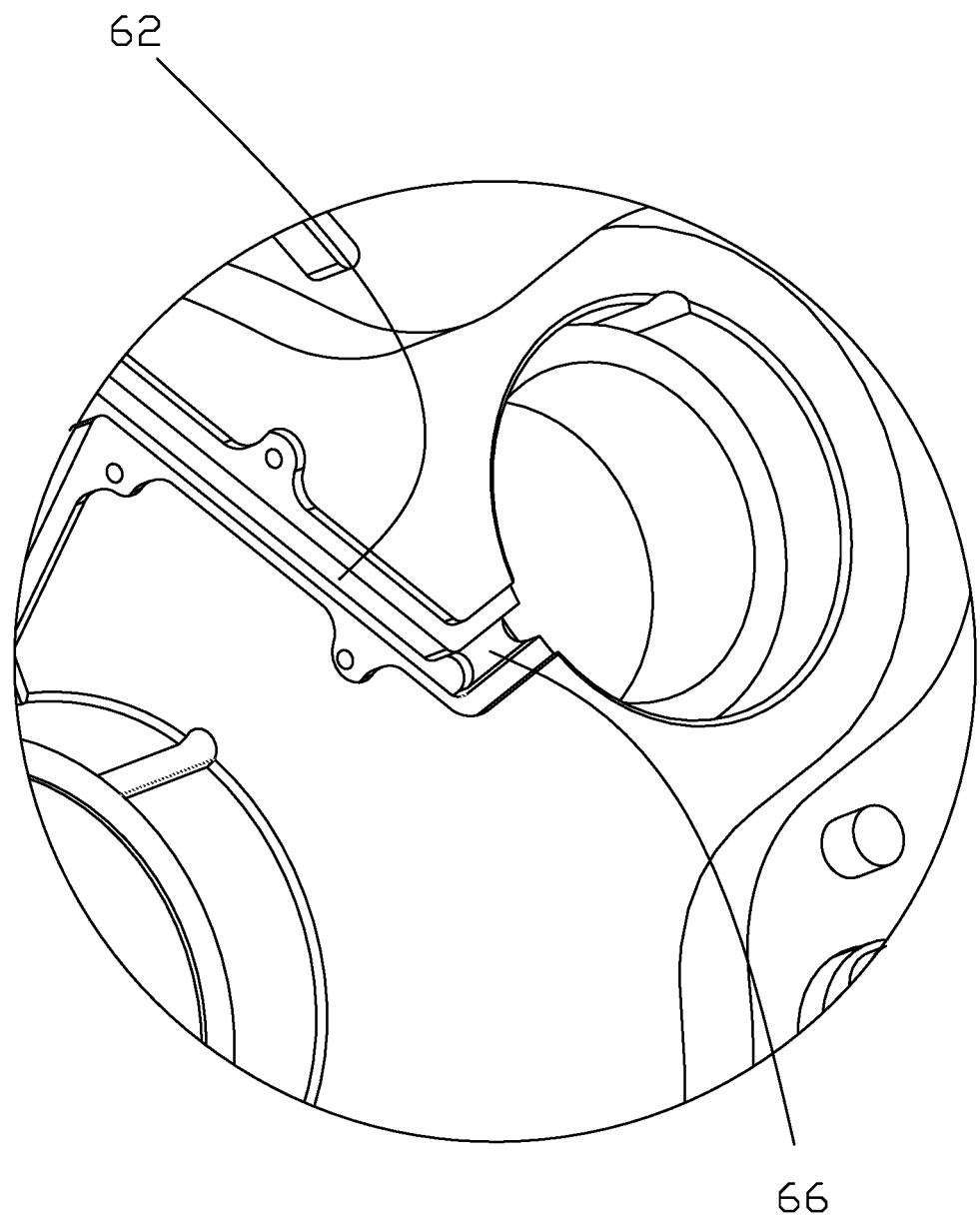
FIG. 7 is an enlarged view of the base of the preferred embodiment of the present invention, showing the stepped protrusion of the bearing seat duct.
Figure 8:
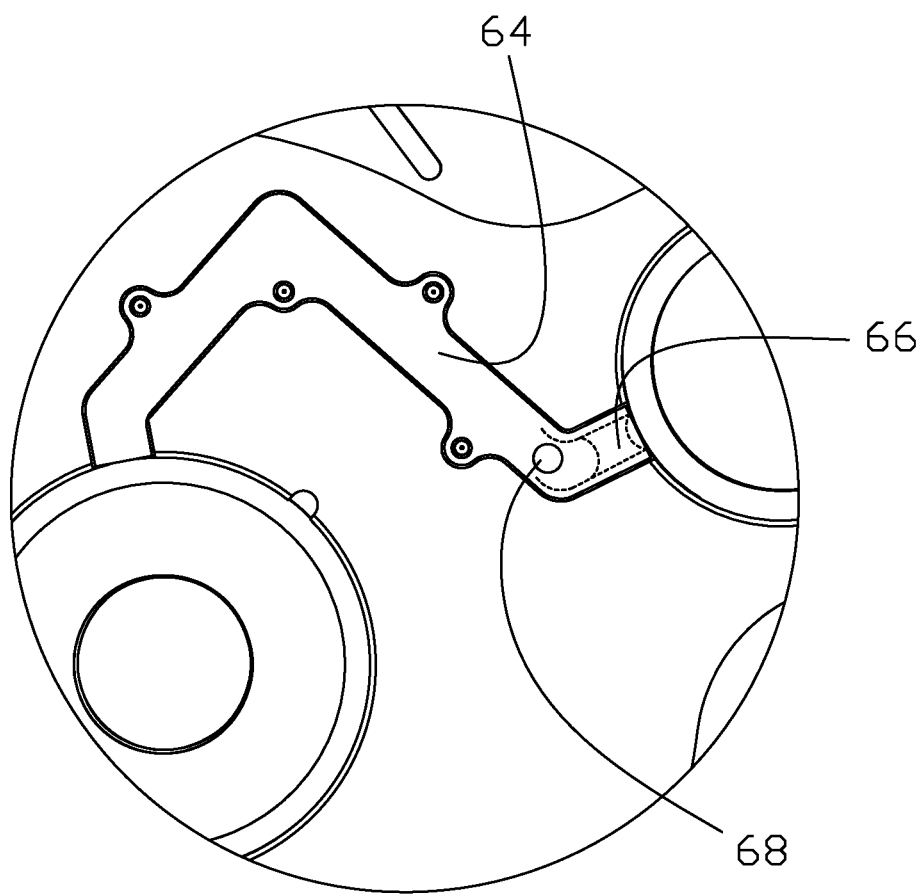
FIG. 8 is an enlarged view of the base of the preferred embodiment of the present invention, showing the outlet of the stepped protrusion of the bearing seat duct and the lid.

As shown in FIG. 7 and FIG. 8, the slot section 62 is provided with a stepped protrusion 66 on a bottom thereof. The stepped protrusion 66 is adjacent to the driving gear bearing seat 52. The lid 64 is provided with a jet bore 68, and the jet bore 68 is associated with the stepped protrusion 66.

As shown in FIG. 5, the lubrication duct unit further includes a driven gear bearing seat duct 70, which has a section formed on the bottom of the driven gear bearing seat 50 and a section formed on a sidewall thereof. The section of the driven gear bearing seat duct 70 on the sidewall of the driven gear bearing seat 50 is communicated with the bearing seat duct 60. The driven gear bearing seat duct 70 has a first guiding section 72 on the sidewall of driven gear bearing seat 50 and is communicated with the section on the bottom thereof. The first guiding section 72 has an end opened at an upper edge of the driven gear bearing seat 50, in other words, it is opened on the bottom of the base 12.

The lubrication duct unit further includes a driving gear bearing seat duct 76. Similar to the driven gear bearing seat duct 70, the driving gear bearing seat duct 76 has a section formed on the bottom of the driving gear bearing seat 52 and a section formed on a sidewall thereof. The section of the driving gear bearing seat duct 76 on the sidewall of the driving gear bearing seat 52 is communicated with the bearing seat duct 60. The driving gear bearing seat duct 76 has a second guiding section 74 on the sidewall of the driving gear bearing seat 52 and is communicated with the section on the bottom thereof. The second guiding section 74 has an end opened at an upper edge of the driving gear bearing seat 52, in other words, it is opened on the bottom of the base 12.

As shown in FIG. 5, the present embodiment further is provided with a bubble eliminating device 80 on the bottom of the base 12. The bubble eliminating device 80 is beside the driving gear bearing seat 52, and has a plurality of ribs 82. The ribs 82 are parallel to each other and have protrusions on opposite sidewalls.

Figure 9:
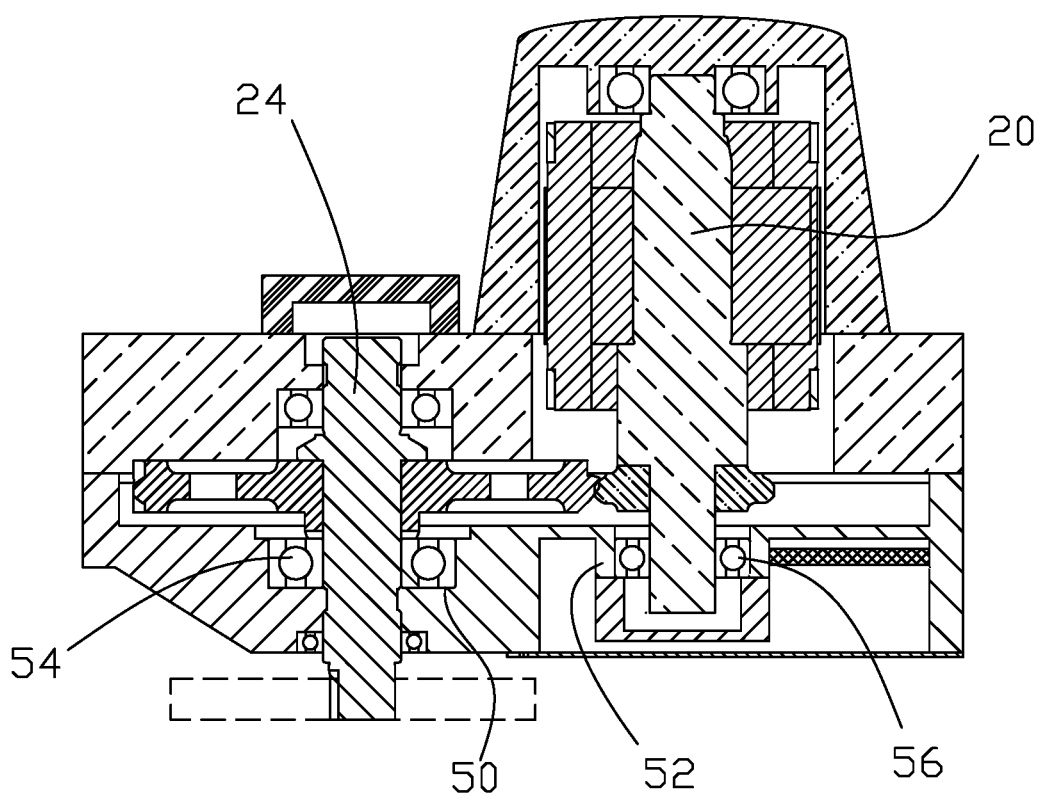
FIG. 9 is a sectional view of the preferred embodiment of the present invention, showing the driven gear shaft, the driving shaft, and the bearing seat.

As shown in FIG. 9, a driven bearing 54 is mounted in the driven gear bearing seat 50 and connected to the driven gear shaft 24. A driving gear bearing 56 is mounted in the driving gear bearing seat 52 and connected to the driving shaft 20.

Figure 10:
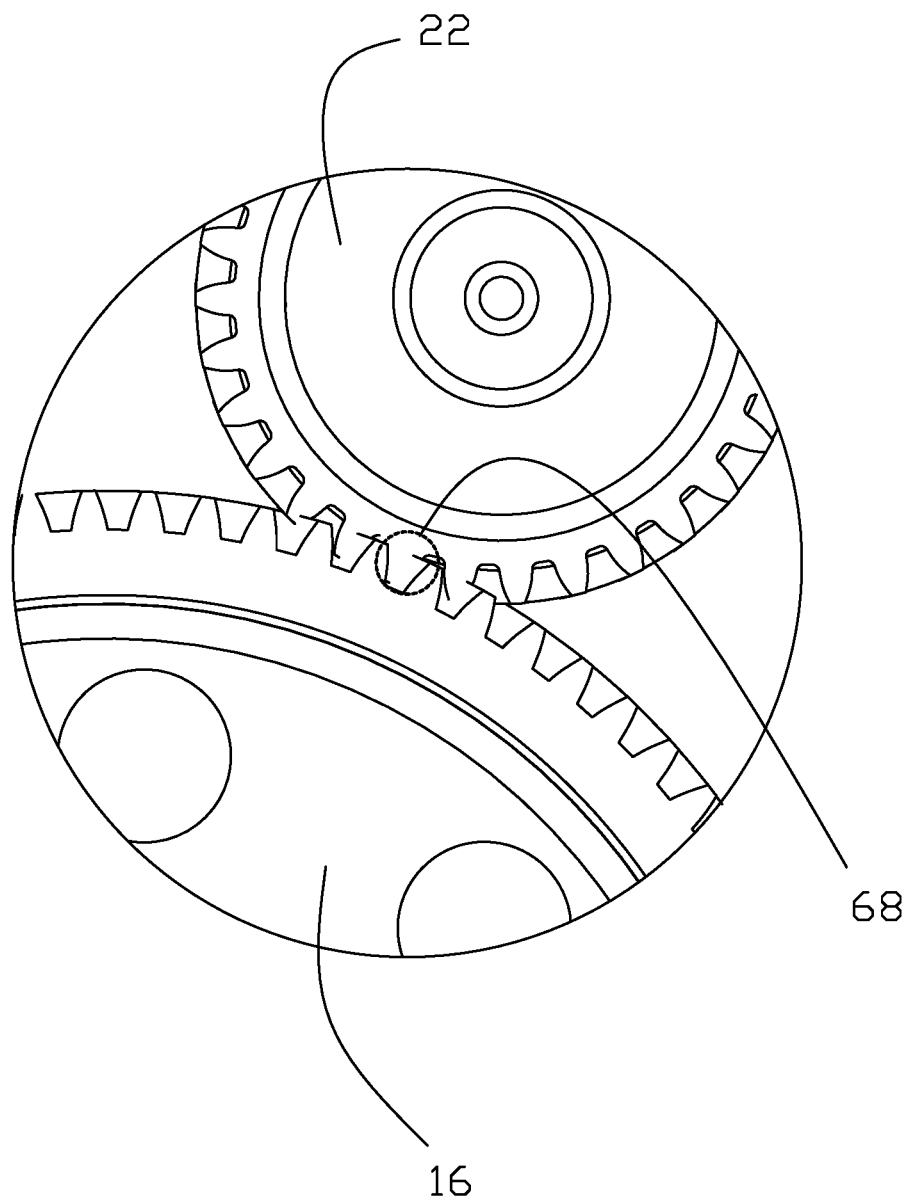
FIG. 10 is an enlarged view of the preferred embodiment of the present invention, showing the mesh of the driven gear shaft and the transmission gear.

As shown in FIG. 10, the jet bore 68 of the lid 64 is aligned with meshed teeth of the driving gear 22 and the driven gear 16.

Figure 11:
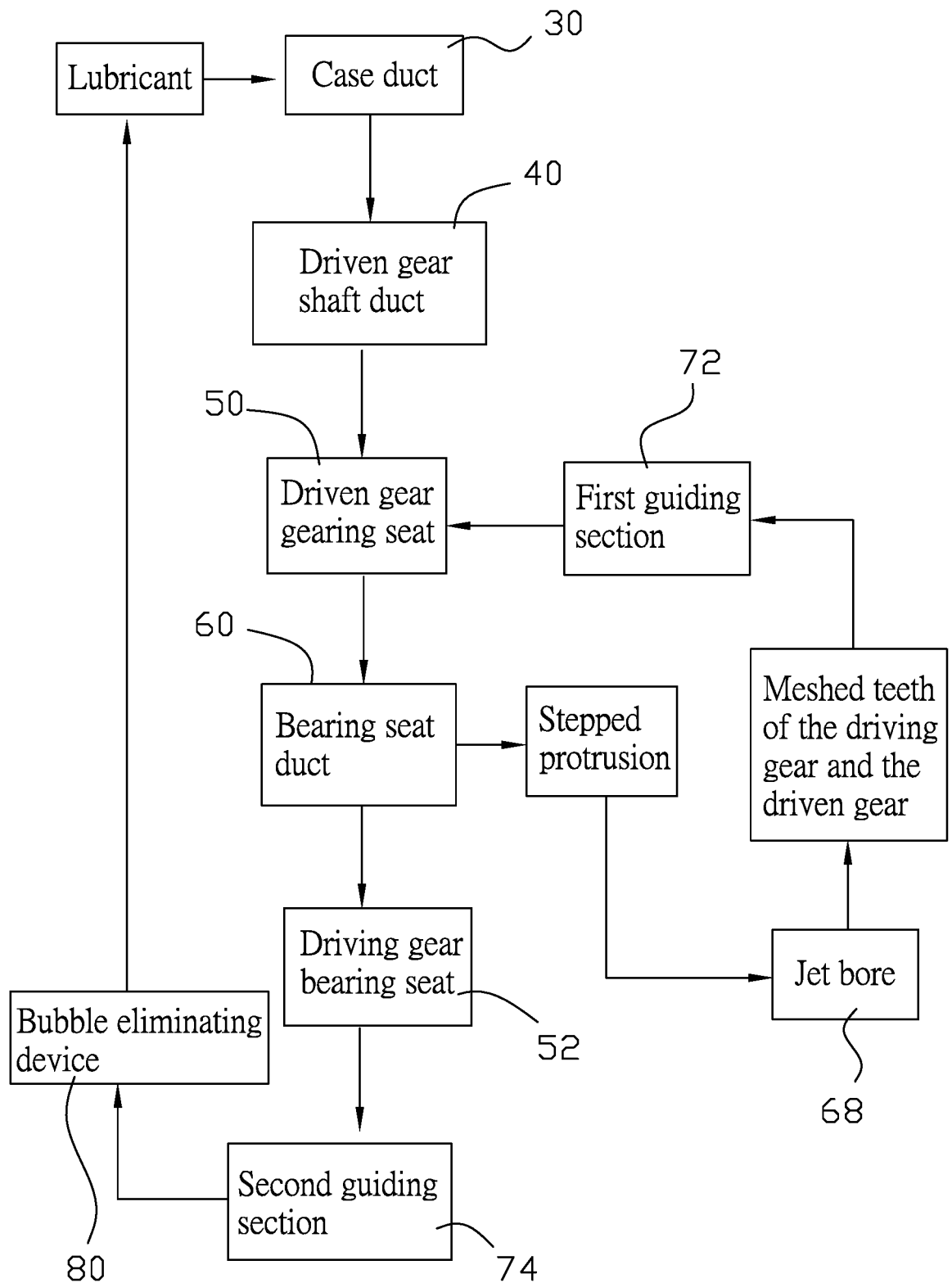
FIG. 11 is a flowchart of the preferred embodiment of the present invention, showing the lubricant flowing route.

As shown in FIG. 11, when a pump (not shown) pumps lubricant from a tank (not shown), the lubricant flows to the driven gear shaft duct 40 from the case duct 30, and then flows to the driven gear bearing seat 50 through the driven gear bearing seat duct 70. Next, the lubricant flows to the driving gear bearing seat 52 through the bearing seat duct 60 and the driving gear bearing seat duct 76 when the driven gear bearing seat 50 is filled up. After the driving gear bearing seat 52 is filled with the lubricant, the lubricant flows to the bubble eliminating device 80 through the second guiding section 74. The ribs 82 and the protrusions of the bubble eliminating device 80 may eliminate bubbles in the lubricant. Finally, the lubricant will flows back to the case duct 30.

As shown in FIGS. 7, 8, 10, and 11, the lubricant in the bearing seat duct 60 will flows to the meshed teeth of the driving gear 22 and the driven gear 16 through the jet bore 68 of the lid 64. The lubricant will be jetted out of the jet bore 68 because of the stepped protrusion 66. Finally, the lubricant will flows back to the driven gear bearing seat 50 through the first guiding section 72.

Figure 12:
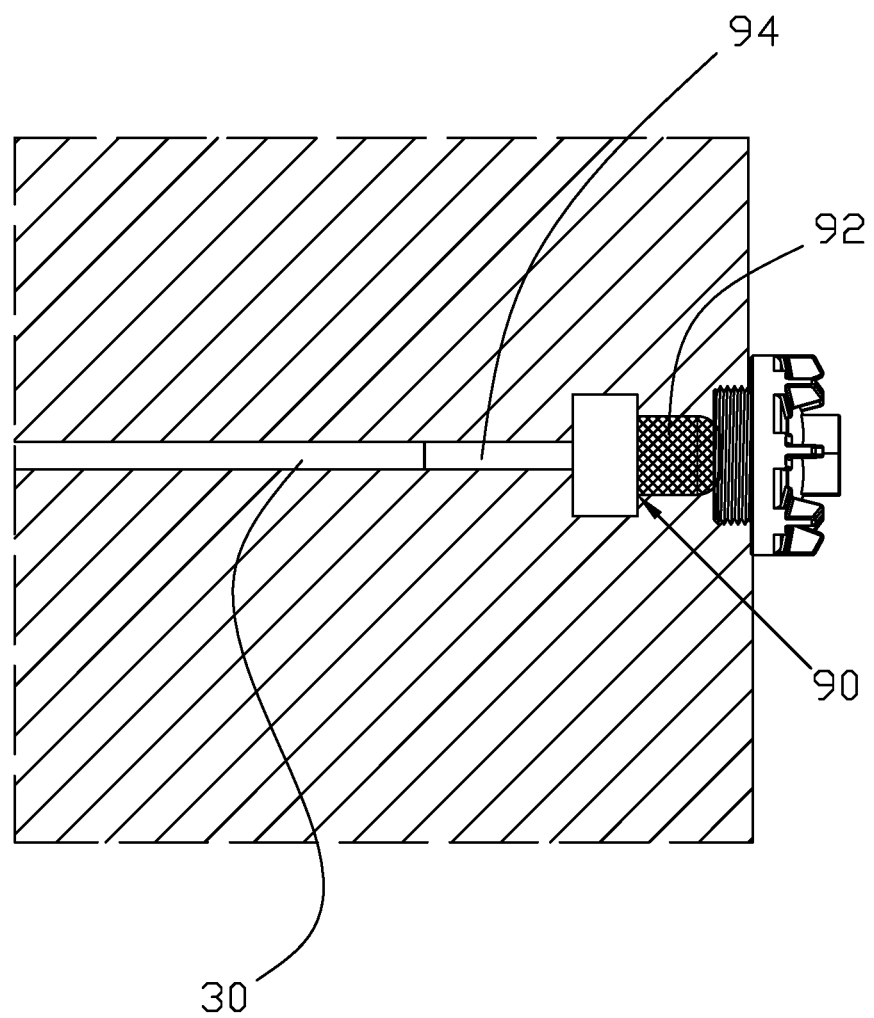
FIG. 12 is a sectional view of the preferred embodiment of the present invention, showing the filter device.

As shown in FIG. 12, the present embodiment further is provided with a filter device 90. The filter device 90 has a filter 92 and a pipe 94 connected to the filter 92. A distal end of pipe 94 extends to the case duct 30. The pump deliveries the lubricant to the filter 92 to filter it, and then the lubricant flows to the case duct 30 through the pipe 94.

Figure 13:
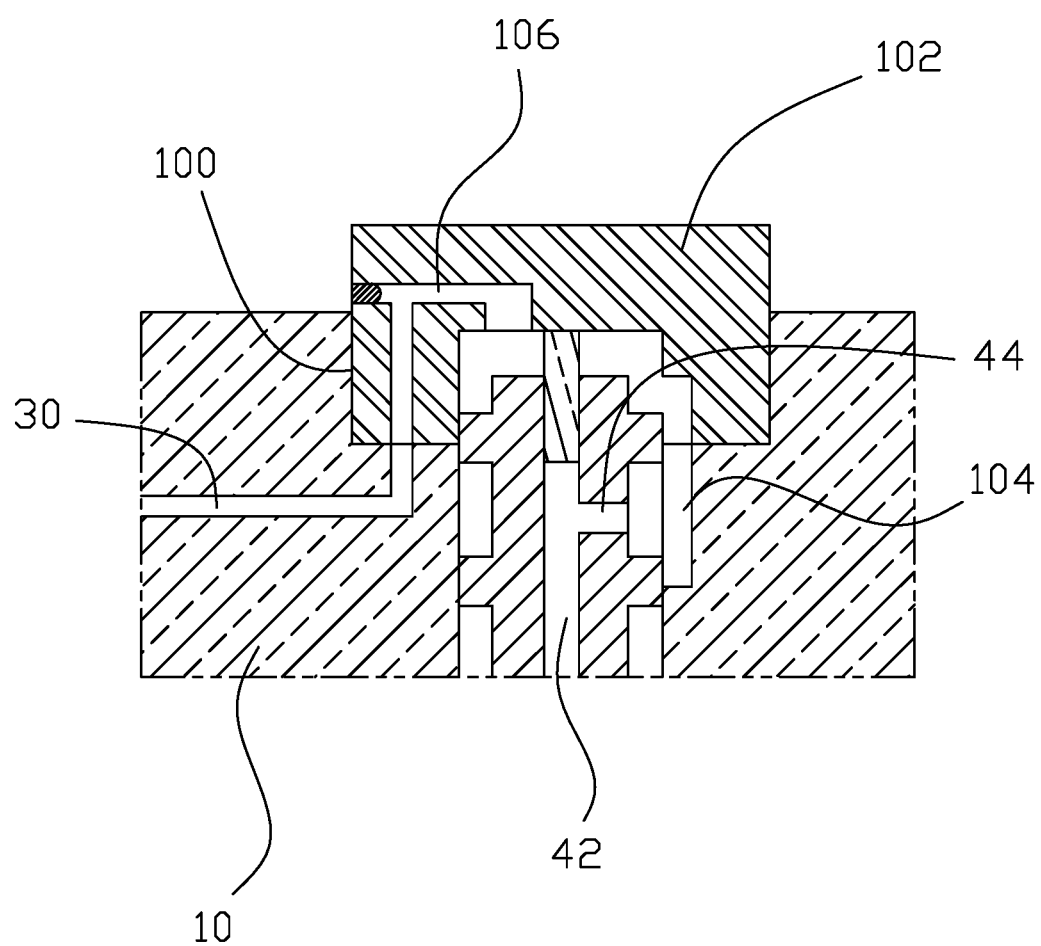
FIG. 13 is a sectional view of the preferred embodiment of the present invention, showing the lubricating duct of the lid, the lubricating duct of the case, and the lubricating duct of the driven gear shaft.

As shown in FIG. 13, the case 10 is provided with a slot 100, and a cover 102 is inserted into the slot 100. The case 10 is provided with a third guiding slot 104 on a sidewall of the slot 100, and the cover 102 has a cover duct 106 therein. An end of the cover duct 106 is communicated with the case duct 30, and the other end thereof is communicated with the axial section 42 of the driven gear shaft duct 40. The axial section 42 of the driven gear shaft duct 40 is communicated with the third guiding slot 104 through the first bore 44.

Figure 14:
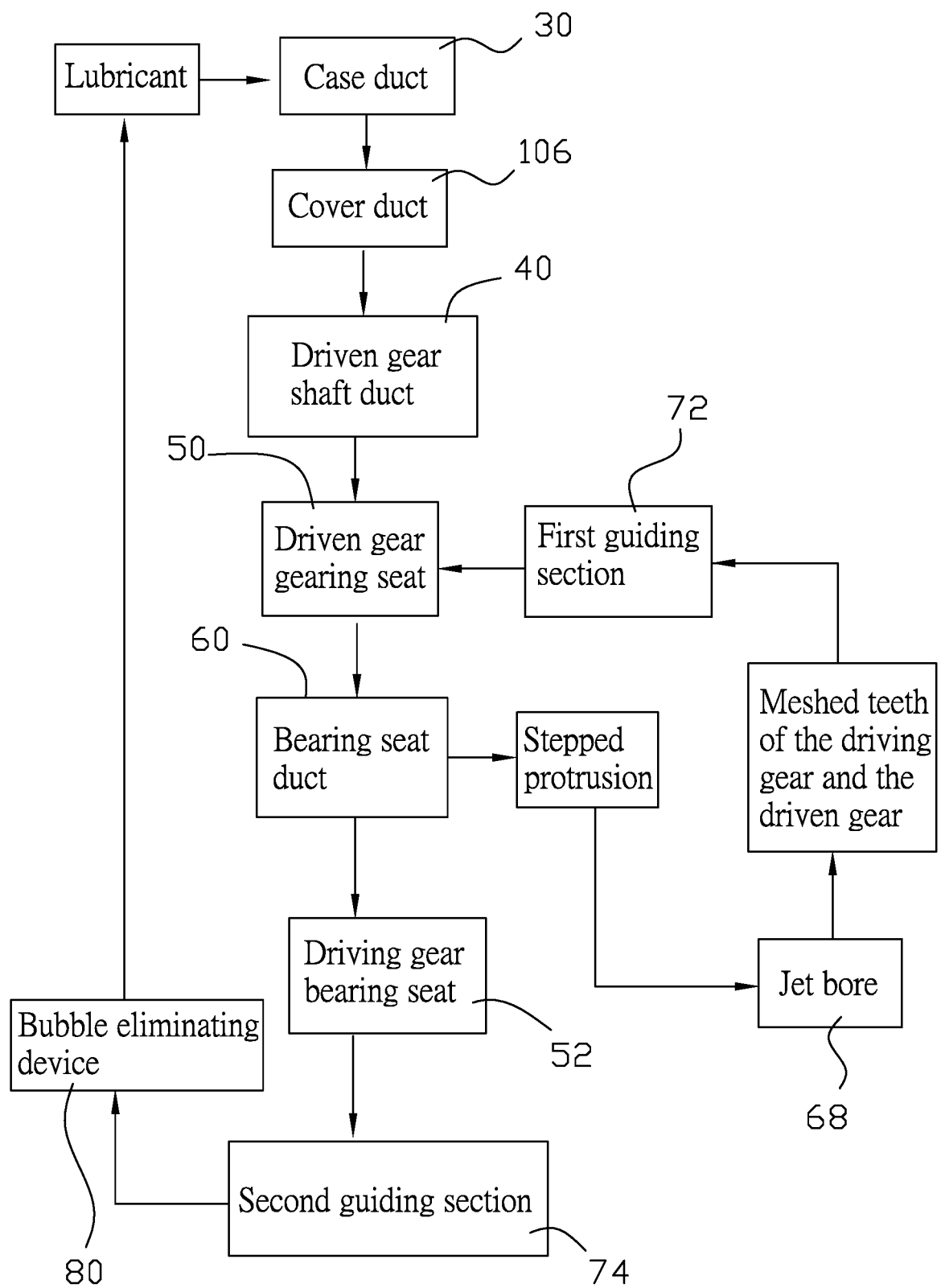
FIG. 14 is a flowchart of the preferred embodiment of the present invention, showing another lubricant flowing route.

As shown in FIG. 14, the lubricant flows to the cover duct 106 from the case duct 30, and then flows to the axial section 42 of the driven gear shaft duct 40 through the third guiding slot 104 and the first bore 44. Next, the lubricant flows to the driven gear bearing seat 50 through the second bore 46. When the driven gear bearing seat 50 is filled up, the lubricant flows to the driving gear bearing seat 52 through the bearing seat duct 60. Next, the lubricant flows to the bubble eliminating device 80 through the second guiding section 74 when the driving gear bearing seat 52 is filled up as described above.

In conclusion, the electric motor 18 and the driven gear 16 are integrated in the case 10, so the lubricant flowing distance is shorter than the prior art to increase the effects of lubrication and reducing temperature. The present invention provides the jet bore 68 to jet the lubricant directly to the meshed teeth of the driving gear 22 and the driven gear 16 to enhance the lubrication effect.

In addition, the ribs 82 and the protrusions on the ribs 82 of the bubble eliminating device 80 may eliminate bubbles in the lubricant quickly that is helpful to the lubrication, and the driven gear bearing seat 50 and the driving gear bearing seat 52 are filled with the lubricant that are helpful to lubrication.

It must be pointed out that the embodiments described above are only some preferred embodiments of the present invention. All equivalent structures which employ the concepts disclosed in this specification and the appended claims should fall within the scope of the present invention.

What is claimed is:

1. A lubrication system of a power assembly of an electric scooter, wherein the power assembly includes a case, in which a driven gear bearing seat and a driving gear bearing seat are provided; a driven gear has a driven gear shaft and a driven gear bearing on the driven gear shaft, and a driving gear has a driving gear shaft and a driving gear bearing on the driving gear shaft; the driven gear is received in the driven gear bearing seat, and the driving gear is received in the driving gear bearing seat; and the driven gear meshes with the driving gear; the lubrication system comprising:

a case duct provided in the case;

a driven gear shaft duct having an axial section, a first bore, and a second bore in the driven gear shaft of the driven gear, wherein the axial section extends in an axial direction of the driven gear shaft while the first bore and the second bore extend in a radial direction of the driven gear shaft; both the first bore and the second bore are communicated with the axial section; the axial section is communicated with the case duct through the first bore and communicated with the driven gear bearing seat through the second bore; and a bearing seat duct provided in the case and having opposite ends connected to the driven gear bearing seat and the driving gear bearing seat respectively;

wherein a lubricant flows through the case duct, the axial section of the driven gear shaft duct, the driven gear bearing seat, the bearing seat duct, and the driving gear bearing seat in sequence.

2. The lubrication system of claim 1, further comprising a driven gear bearing seat duct having a section on a bottom of the driven gear bearing seat and a section on a sidewall thereof, wherein the section on the sidewall is communicated with the bearing seat duct.

3. The lubrication system of claim 2, wherein the driven gear bearing seat duct further having a first guiding section on the sidewall of the driven gear bearing seat, and the first guiding section has an end opened at an upper edge of the driven gear bearing seat.

4. The lubrication system of claim 1, wherein the bearing seat duct includes a slot section formed on the case and a lid connected to the case to seal the slot section.

5. The lubrication system of claim 4, wherein the bearing seat duct further includes a stepped protrusion in the slot section and a jet bore on the lid; the stepped protrusion is adjacent to the jet bore, and the jet bore is aligned with meshed teeth of the driven gear and the driving gear.

6. The lubrication system of claim 1, further comprising a driving gear bearing seat duct having a section on a bottom of the driving gear bearing seat and a section on a sidewall thereof, wherein the section on the sidewall is communicated with the bearing seat duct, and the driving gear bearing seat duct further having a second guiding section on the sidewall of the driving gear bearing seat, and the second guiding section has an end opened at an upper edge of the driving gear bearing seat.

7. The lubrication system of claim 1, wherein the case is provided with a bubble eliminating device beside the driving gear bearing seat; the lubricant flows to the bubble eliminating device from the driving gear bearing seat.

8. The lubrication system of claim 7, wherein the bubble eliminating device includes a plurality of ribs on the case and protrusions on the ribs.

9. The lubrication system of claim 1, further comprising a filter device provided on the case associated with the case duct, wherein the filter device has a filter and a pipe, and the pipe has an opposite end connected to the filter and the case duct.

10. The lubrication system of claim 1, wherein the case further has a slot, a cover engaging the slot, and a third guiding section on a sidewall of the slot; the cover is provided with a cover duct therein; the cover duct is communicated with the case duct and the third guiding slot respectively; and the third guiding section is communicated with the first bore of the driven gear shaft duct.

* * * * *